United States Patent [19]

Schlegel

[11] 4,329,155
[45] May 11, 1982

[54] PROCESS FOR THE PURIFICATION OF WASTE SULFURIC ACID CONTAINING FLUORIDE

[75] Inventor: Rainer Schlegel, Hattersheim am Main, Fed. Rep. of Germany

[73] Assignee: Hoechst Aktiengesellschaft, Frankfurt am Main, Fed. Rep. of Germany

[21] Appl. No.: 167,402

[22] Filed: Jul. 11, 1980

[30] Foreign Application Priority Data

Jul. 14, 1979 [DE] Fed. Rep. of Germany ....... 2928598

[51] Int. Cl.³ .......................... B01D 1/14; B01D 1/30; B01D 3/02; C01B 17/90
[52] U.S. Cl. ...................................... 23/306; 203/86; 261/114 TC; 422/241; 423/531
[58] Field of Search ................... 23/306, 307; 203/86, 203/12; 423/531; 261/94, 113, 114 R, 114 A, 114 TC; 422/241

[56] References Cited

U.S. PATENT DOCUMENTS

| | | | |
|---|---|---|---|
| 2,970,042 | 1/1961 | Lagerwey | 422/241 |
| 3,294,650 | 12/1966 | Manteufel | 423/531 |
| 3,414,246 | 12/1968 | Weeden et al. | 261/113 |
| 3,677,701 | 7/1972 | Hollingsworth et al. | |
| 3,749,648 | 7/1973 | Boettler et al. | 423/531 |
| 3,933,575 | 1/1976 | Guth et al. | 423/531 |
| 3,972,987 | 8/1976 | von Plessen et al. | 423/531 |
| 3,976,759 | 8/1976 | Bennett et al. | 423/531 |
| 4,010,240 | 3/1977 | von Plessen et al. | 423/531 |
| 4,032,622 | 6/1977 | von Plessen et al. | 423/531 |
| 4,166,536 | 9/1979 | Roberts et al. | 422/241 |
| 4,233,281 | 11/1980 | Hirko et al. | 203/12 |

*Primary Examiner*—Bradley Garris
*Attorney, Agent, or Firm*—Curtis, Morris & Safford

[57] ABSTRACT

The invention relates to a process for the purification of fluoride-containing 65 to 95% strength waste sulfuric acid which contains water, organic impurities and fluoride. The impure sulfuric acid is introduced onto the top tray of a stripping column, in which this waste acid is heated and pre-concentrated. The heated acid then flows into a heating tank filled with boiling concentrated sulfuric acid. The sulfuric acid vapors escaping from this heating tank are condensed in the stripping column by the waste sulfuric acid flowing in countercurrent. According to the invention, at least in the region of one tray of the stripping column, construction components which come into contact with acid vapors or liquid acid consist of acid-resistant plastic, at least on the surface.

5 Claims, 10 Drawing Figures

PROCESS FOR THE PURIFICATION OF WASTE SULFURIC ACID CONTAINING FLUORIDE

The present invention relates to a process and a device for the purification and simultaneous concentration of waste sulfuric acid which, in addition to water, also contains fluoride and in some cases also organic impurities.

A waste sulfuric acid containing fluoride ions is frequently obtained in the manufacture of aromatic fluorine compounds in the presence of concentrated sulfuric acid. The waste sulfuric acid can furthermore also contain water, relatively large amounts of aromatic fluorine compounds and inorganic impurities. Therefore it is necessary to regenerate such waste acids for environmental reasons. It proves to be precisely the fluoride impurity which has a highly corrosive action on metallic materials in the presence of sulfuric acid. It is therefore necessary to remove the fluoride impurity from the waste sulfuric acid as early and as completely as possible.

Thus, a process in which kieselguhr is added in excess to the waste sulfuric acid, whereupon fluoride becomes chemically bonded and escapes in the form of gaseous $SiF_4$, is known from U.S. Pat. No. 3,677,701. When the reaction has ended, residual kieselguhr is filtered off. The waste acid thus treated is then distilled in vacuo in a conventional stripping column for further removal of fluorine. The stripping column is thus not charged with the total amount of fluoride and corrosion is reduced considerably. The disadvantage of this process is the filtration of the excess kieselguhr from the acid which has been freed from fluoride, which in some cases has to be carried out under pressure. Since this process takes place at room temperature, organic fluorine compounds which may be dissolved in the sulfuric acid are not destroyed.

U.S. Pat. No. 3,749,648 relates to a further process for removal of fluoride from waste sulfuric acid originating from the manufacture of chlorodinitrobenzotrifluoride. In this process, most of the organic nitro and fluorine compounds are first removed from the waste sulfuric acid at a sulfuric acid concentration of 86 to 93% by a suitable extraction agent and the acid is then diluted with water to less than 72% strength and distilled with steam. Under these conditions, hydrogen fluoride and organic fluorine compounds are driven off over the top. The waste sulfuric acid obtained at the bottom of the column still contains higher-boiling organic compounds. After cooling, filtration and treatment with active charcoal, the waste sulfuric acid thus purified can be passed to a concentrating step. However, the large number of steps in this working up process necessitates a considerable expenditure on apparatus.

In Europe, waste sulfuric acid from nitration processes is frequently concentrated by the known Pauling process (German Patent specification No. 299,774). A Pauling apparatus essentially consists of a cast-iron kettle and a high-silicon cast iron stripping column with several actual trays. The waste sulfuric acid is introduced in a concentration of more than 68% and is concentrated to at least 96% strength at a kettle temperature of 310° to 325° C. Working up of fluoride-containing waste sulfuric acid in this apparatus would rapidly lead to destruction of the high-silicon cast iron column. Similar objections apply to acids which are indeed free from inorganic fluoride but liberate hydrogen fluoride in the stripping column of the Pauling apparatus, for example by hydrolysis of dissolved nitrofluoro-aromatics.

Because of the threatened corrosion it is also not possible to work up fluoride-containing waste sulfuric acids by other known processes for the concentration of waste sulfuric acid for which equipment made of the materials from the group comprising high-silicon cast iron, (R)Hastelloy, glass or enameled steel has to be used. Furthermore, graphite cannot be employed if the waste sulfuric acid contains nitric acid. Experiments have shown that stripping columns manufactured from tantalum or gold would be suitable for the purification of waste sulfuric acid containing fluoride. However, it is decidedly expensive to construct a tantalum or gold stripping column on an industrial scale.

There was thus the object of providing a process which enables waste sulfuric acid containing fluoride to be worked up without relatively large amounts of metals which are difficult to work or expensive, such as tantalum or gold, having to be used for the process equipment.

A process has now been found for the purification of fluoride-containing 65 to 95% strength waste sulfuric acid which contains water, organic impurities and fluoride, by introducing the impure sulfuric acid onto the top tray of a stripping column, in which this waste acid is heated up and pre-concentrated, subsequently passing the heated acid into a heating tank filled with boiling concentrated sulfuric acid and condensing the sulfuric acid vapors escaping from this heating tank in the stripping column by means of the waste sulfuric acid flowing in counter-current, wherein, at least in the region of one tray of the stripping column, construction components which come into contact with acid vapors or liquid acid consist of acid-resistant plastic, at least on the surface.

If acid-resistant plastic is not used for construction components which come into contact with acid, virtually the only resistant material available is tantalum, which is difficult to work. It is therefore advantageous if, at least in the region of one tray of the stripping column, all the construction components are produced from plastic, at least on the surface.

This is particularly appropriate in the region of the top tray or of the top trays of the stripping column, because the highest HF concentrations and the lowest temperatures arise here.

However, the lowest trays of the stripping column are in contact with boiling sulfuric acid, so that, under normal pressure, plastic components are no longer sufficiently resistant at the prevailing temperatures. Furthermore, in the correct procedure hydrogen fluoride has already been driven off in this region, which makes it possible to use metallic materials.

The use of acid-resistant plastic can be limited to the surface of construction components (for example perforated trays and bubble trays) if the high mechanical strength of the metallic core is desired. Construction components can otherwise be manufactured completely from plastic (for example lining of the column jacket, bubble-caps for bubble trays).

In the purification process according to the invention, the acid is simultaneously concentrated, so that at the end a 95 to 97% strength purified acid which can be re-used is obtained. The content of inorganic fluoride in the waste acid should not exceed 5% by weight, because otherwise the stripping column must contain too many trays. The lower limit of the fluoride content is given only by the limit of analytical detection. Nevertheless, the use, according to the invention, of plastic is no longer necessary at fluoride contents of less than 0.01%, since the customary materials are then sufficiently resistant. Fluoride contents of 0.02%, however, still lead to a significant increase in the rate of corrosion. The amount of organic impurities (calculated as carbon) should not exceed 2% by weight, otherwise high losses of acid during regeneration must be tolerated or relatively large amounts of nitric acid must be added.

The lower trays of the stripping column, that is to say those adjacent to the heating tank, are preferably manufactured from high-silicon cast iron.

The nature of the heating tank is not critical. For example, tubular heating elements of hard lead can be used (Simson-Mantius process). In this variant of the process according to the invention, the heating tank is a heating tube, the process is carried out under an operating pressure of 3 to 300 mbars, the stripping column has several trays, a temperature of 135°–250° C. is maintained in the lower tray of the stripping column and, at least in the region of one tray of the stripping column, construction components which come into contact with acid vapors or liquid acid consist of acid-resistant plastic, at least on the surface.

However, a Pauling distillation kettle (made of cast iron), on which a stripping column with two sections is mounted, is preferably used as the heating tank. The lower section of the stripping column is in general manufactured from high-silicon cast iron, whilst in the upper section, at least in the region of one tray, construction components which come into contact with acid vapors or liquid acid consist of acid-resistant plastic, at least on the surface.

This process is preferably carried out under operating pressures of 0.2 to 2 bars. It is therefore possible at the same time to maintain temperatures of 60°–250° C. in the upper section of the stripping column. At higher temperatures, the known acid-resistant plastics loose most of their mechanical strength, so that sufficient stability of the components manufactured from these plastics is no longer ensured.

Acid-resistant plastics which can be used are polyvinylindenefluoride and polytetrafluoroethylene. If the equipment is exposed to relatively low temperatures, polytrifluorochloroethylene, polyphenylene sulfide (Ryton) and Penton can also be used. The use of polytetrafluoroethylene is preferred.

The separating capacity of the stripping column should correspond to a total of 2 to 12, preferably 2 to 8, actual plates. As the fluoride contents increase, the number of plates required so that, during regeneration, the fluoride concentration at the lowest plastic plate has fallen to such low values that high-silicon cast iron is no longer attacked, also increases. The lower section (in general manufactured from high-silicon cast iron) of the stripping column contains 1 to 3 actual trays; the upper section, which is manufactured using plastic, consists of 1 to 9, preferably 1 to 7 and in particular 1 to 5, actual trays.

The vapors escaping from the stripping column can be condensed in a suitable condensing device. At the same time, the waste sulfuric acid to be worked up can be pre-heated by the heat of condensation. This working up process is particularly energy-saving.

In order to protect the upper stripping column from corrosion, if tantalum is not used, the trays with built-on fitments (sieves or grids for packing, or trays with sieves or bubble-caps) must consist of plastic, at least on the surface. The same applies to the cylindrical column jacket. These plastic components are called "plastic built-in fitments" in the following text. The advantageous mechanical properties of materials which are in themselves known (such as, for example, steel) and the good chemical stability of the plastics can be combined by lining the inside of the upper section of the column with plastic. In most cases (for example when polytetrafluoroethylene is used), the plastic linings cannot be stuck onto the outer metallic jacket. In order nevertheless to achieve a stable connection between the plastic and the supporting outer jacket, it is advantageous to divide the upper stripping column into cylindrical sections which have flanges and are each lined with plastic and connected to one another by the flanges. It is thereby possible to achieve short clamped lengths (for example from 200 to 600 mm) for the lining, which is advantageous for improving the mechanical stability. At the same time, the trays (made of plastic) can also be fixed on the inside via these flange connections. It is appropriate to determine the clamping positions according to the number of trays chosen. For example, should a relatively large distance between trays be required, for example over 600 mm, it is possible to fit only every second clamping position with a tray.

As experiments have shown, in spite of these measures, doming of the plastic lining after relatively long operating times at the temperature and pressure variations prevailing in the upper stripping column cannot be excluded with certainty. Where possible, the lining of acid-resistant plastic should thus be connected to the outer metallic jacket by positive locking or non-positive locking (for example by adhesion). This cannot be achieved in some cases. In these instances, a further substantial improvement in the mechanical and heat stability of the plastic lining can be achieved by using a pressure in the gap between the internal plastic lining and the metallic jacket of the column at least 10 mbars lower than that in the column itself during operation of the column. As a result of this pressure difference, the plastic lining is pressed against the metallic jacket of the column and supported. It is thus possible to operate the plastic-lined column up to at most 250° C., even under reduced pressure.

The plastic used for the plastic built-in fitments can contain inert fillers, in particular graphite or glass fibers, whereby a further improvement in the mechanical and heat stability of the plastic components can be achieved.

The trays can be designed as bubble trays, perforated trays or as a grid for accommodating packing. As mentioned above, the trays can be clamped between two flanges in a simple manner. In addition, it is also possible to shape the trays as cylindrical pots and to place the pots one on top of the other inside the column. It is then no longer necessary to clamp the trays. The bottoms of the pots carry the bubble-caps or serve as perforated trays.

It has been found that non-reinforced plastic trays (for example polytetrafluoroethylene bubble trays) of large dimensions are susceptible to damage by exposure to heat. When warmed, they may dome, whereupon properly functioning mass transfer is impossible. However, these difficulties can be eliminated if the trays are manufactured from a sheet of metal and provided with a plastic coating, even in the area of the openings for the product to pass through. It is necessary to weld the coating at the openings where the product passes through. Perforated metallic trays can also be coated likewise. When plastic bubble-caps with a suitable clamping edge are used, it is also possible to clamp the overlapping edges of the films firmly to one another. It is particularly advantageous to produce the trays from solid plastic and to insert several metallic stiffening profiles along the plane of the plate in a manner such that the stiffening profile does not come into contact with the product or product vapors.

Figure 1:
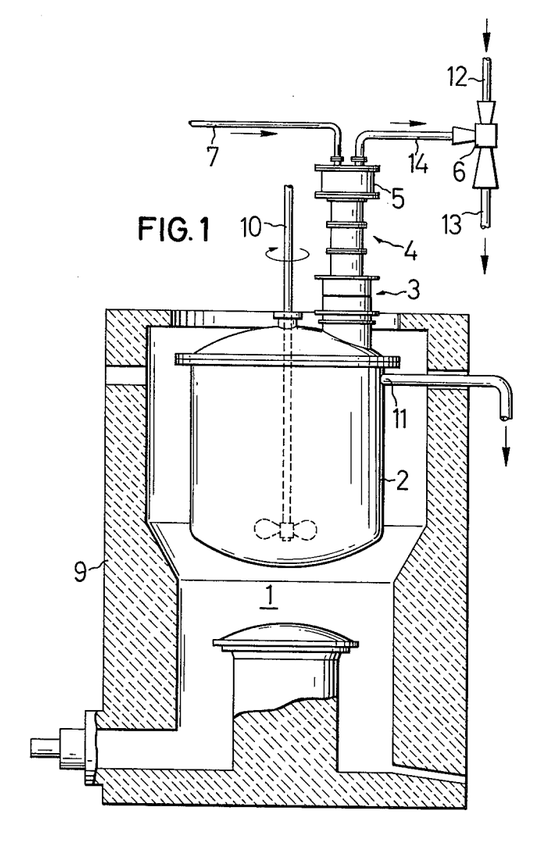

FIG. 1 shows a particular embodiment of the apparatus according to the invention for concentrating sulfuric acid (using a Pauling cast-iron kettle) which enables fluoride to be removed with the vapors.

This apparatus consists of the furnace (1) enclosed by the wall (9), the cast-iron kettle (2), which is filled with approximately 95% strength boiling sulfuric acid, the stirrer (10), the lower stripping column (3), the upper stripping column (4) and the vapor exhaust hood (5). At least some components of (4) are manufactured from acid-resistant plastic and are thus protected from corrosion.

The acid which is to be worked up and contains at least 65% of $H_2SO_4$ is introduced at the upper end of the vapor exhaust hood (5) through line (7). The volatile fluorine compounds in the waste sulfuric acid running in are largely driven off in the upper stripping column (4), consisting of 3 stages (trays) in the drawing, by the vapors rising from the lower stripping column. In the lower stripping column (3), which in this case consists of 2 high-silicon cast iron bubble-caps, the sulfuric acid is concentrated further so that it can run into the kettle (2) with a content of about 92%. The concentrated and regenerated acid leaves the kettle (2) through the overflow (11) and then enters a cooling device (not shown).

The vapors which come off at (5) consist virtually only of steam and contain only very little sulfuric acid. In addition to hydrogen fluoride, they can also contain volatile organic compounds, nitrous gases, $HNO_3$ and $SO_2$. They are conveyed through line (14) to the ejector device (6), where they are drawn off under a reduced pressure of, for example, 40 mbars and precipitated. The reduced pressure in (6) is produced by the pump fluid water, which enters the ejector through line (12). The effluent leaving through line (13) is passed to an effluent purification unit.

The sulfuric acid boiling in the kettle has a water content of about 5%. However, the water content of the vapor phase above the boiling sulfuric acid is significantly above 5%. These vapors rise and come into contact, in counter-current, with the acid running down. The vapors cool and their water content increases. In contrast, the acid running down becomes ever hotter and has an ever lower water content the further down it passes.

The condensation of the vapors can also take place by means of a heat exchanger instead of the ejector device. The waste sulfuric acid to be worked up can be employed as the coolant and is thereby simultaneously pre-heated and thus improves the energy utilization of the acid regeneration. The condensate containing hydrogen fluoride must then be worked up.

Figure 2:
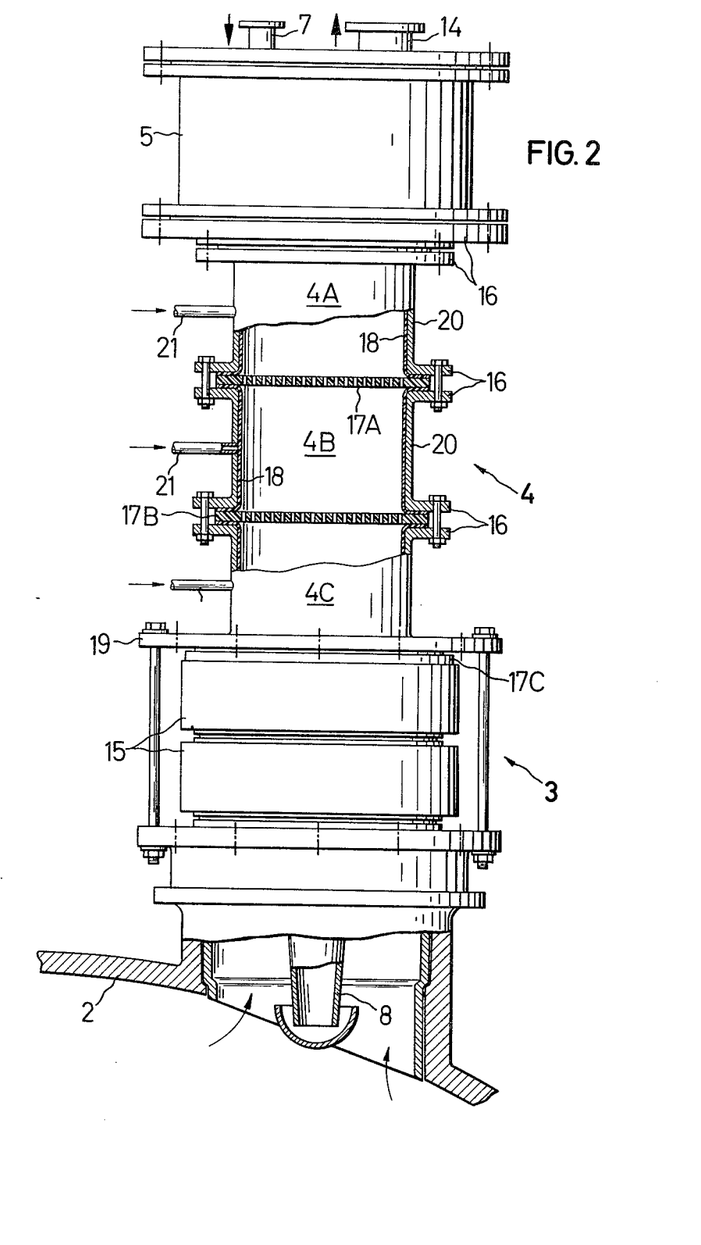

FIG. 2 shows a section of a preferred embodiment of the upper stripping column (4). This column is divided into 3 sections, 4A, 4B and 4C.

Two cylindrical polytetrafluoroethylene linings (18) which are provided with flanges and are separated from one another by a tray (17A, 17B) are clamped between in each case two flanges (16). In the figure, the trays are shown as perforated sheets of solid plastic. Other tray constructions, for example co-using metal, are, of course, also possible. At the upper end of the column, only the flange of one lining (18) is clamped, without a tray; at the lower end of the column, the flange of a lining (18) is pressed onto the lowest tray (17C) by the flange (19).

The narrow jacket-like gaps of each section (4A, 4B, 4C) which are formed by a plastic lining (18) and the metallic jacket (20) surrounding it are coupled to a vacuum-producing device (not shown) via the connections (21). Two high-silicon cast iron bubble-caps (15) can be seen in the lower stripping column (3). (8) is a funnel through which the sulfuric acid runs into the kettle (2).

It is possible, by appropriately choosing the number of exchange trays in the top stripping column, to take into account various fluoride contents in the waste acid. The higher the fluoride content is, the higher also the number of trays in the upper stripping column should be. If the number of exchange trays is fixed, it can be helpful to dilute the fluoride-containing waste acid with a fluoride-free waste acid and thus to lower the average fluoride content. It is furthermore advantageous not to allow the ratio $(W_1-W_2):F_1$ to fall below 10:1 and where possible to choose a ratio of over 40:1. In this ratio, $W_1$ denotes the water content and $F_1$ the fluoride content of the acid running in and $W_2$ denotes the water content of the acid running out.

It has been found that when waste sulfuric acids obtained in the nitration of organic fluorine compounds are worked up, the losses of sulfuric acid through the vapors coming off are particularly high. In order to limit these losses, it is possible to utilize the Pauling unit with a reduced throughput, that is to say with a loss of capacity. To overcome this drawback, it is advantageous to mount a vapor exhaust hood on the upper stripping column. This vapor exhaust hood should have a larger diameter than the stripping column, so that the cross-section of the vapor exhaust hood is at least 30% greater than that of the top stripping column. This enables the vapor velocity to be reduced by at least 30% on entry into the vapor exhaust hood. The acid loss can be reduced to 0.2 to 2% by this embodiment of the process according to the invention. At the same time, the full capacity of the concentration unit is retained.

The upper stripping column can be in the form of either a packed column, a perforated tray column or a bubble tray column. For technological reasons, the bubble tray column is preferred today; however, it is difficult to make bubble-caps from a thermoplastic such that they do not lose their shape under the temperatures to which they are exposed during the $H_2SO_4$ regeneration.

When polytetrafluoroethylene is used as the material for producing the bubble-caps, sintered raw material is advantageously used. The stresses which occur, for example, in the case of extruded material and which lead to loss of shape under exposure to heat are thereby avoided. It is advantageous to use a polytetrafluoroethylene material which contains, as mentioned above, an inert filler, in particular graphite or glass fibers. These fillers increase the stability of shape of the bubble-caps at the operating temperatures of the process according to the invention without impairing the chemical stability.

Figure 3:
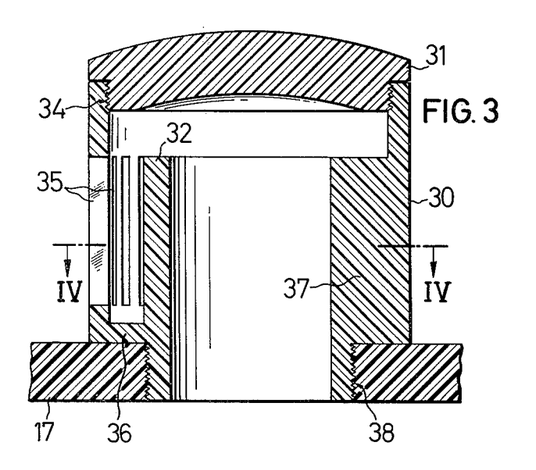

According to the invention, the mechanical stability of a plastic bubble-cap under exposure to heat can be further improved by a special type of shaping. Such a bubble-cap consists, for example, of a cylindrical jacket with several oblong depressions, a cover which closes the cylindrical jacket tightly at the upper end, and an inner cylindrical, concentrically arranged riser which projects out of the cylindrical jacket at the lower end. The inner riser should be integrally connected to the outer jacket. This integral connection is advantageously achieved by at least 2 stays. The higher the number of connecting stays is, the greater is the mechanical strength; however, a substantial increase in the number of stays would prevent the vapors from flowing freely upwards. The stays are preferably arranged in the longitudinal direction (relative to the axis of the cylindrical jacket) and the stay surfaces are aligned radially (that is to say pointing towards the center of the cylindrical jacket). The oblong depressions in the jacket can be slit-shaped or window-shaped. They are in general arranged in the jacket in the longitudinal direction. A bubble-cap with radial stays in the longitudinal direction is shown, inter alia, in FIGS. 3 and 4. The annular gap between the bottom end of the cylindrical jacket (30) and concentric inner riser (32) is closed by an annular disk. FIG. 3 shows a section through a bubble-cap in the axial plane; the section on the right-hand side of the bubble-cap passes through a stay. The cover (31) is fixed to the upper end of the jacket (30) by a screw thread (34). The cover and jacket together are also called the bubble-cap hood. (35) is one of several oblong window-shaped depressions. The annular disk which integrally connects the riser (32) and the cylindrical jacket (30) is labeled (36). (37) indicates the integral connection between the riser, stay and jacket. The bubble-cap is fixed in the tray (17) by the screw thread (38). Other connections, such as a bayonet catch or secured press fit, are also possible.

Figure 4:
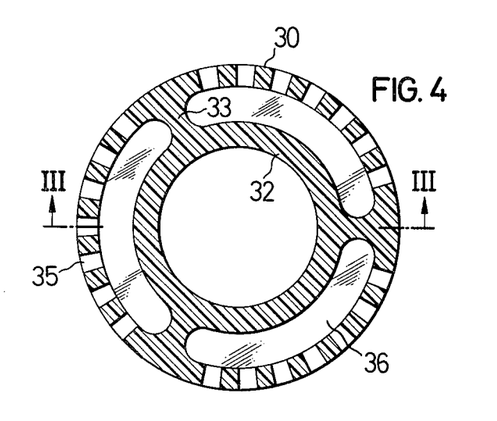

A section is passed through the bubble-cap, perpendicular to the axis, in the plane indicated by line IV in FIG. 3. The sectional area formed is shown in FIG. 4. (33) denotes the stays which connect the jacket (30) to the riser (32). The plane parallel to the axis, indicated by line III, in FIG. 4 is the plane of the paper in FIG. 3.

The bubble-cap according to FIGS. 3 and 4 can by produced by removing material from a plastic cylinder. The hollow spaces are produced by removing material from the top. The windows (35) are produced separately. Finally, the cover (31) is screwed onto the jacket (30). Other connections, such as a bayonet catch or secured press fit, are also possible.

Figure 5:
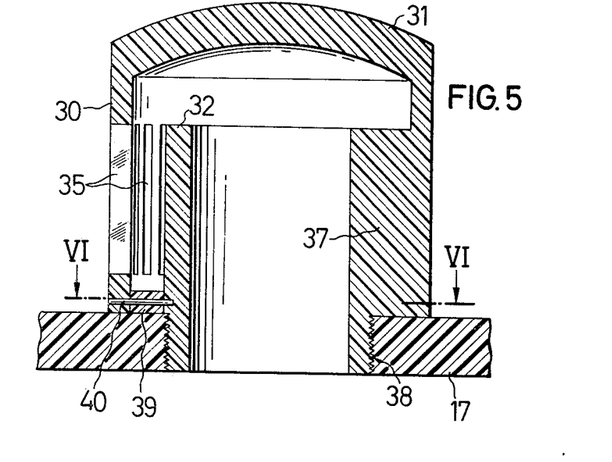
Figure 6:
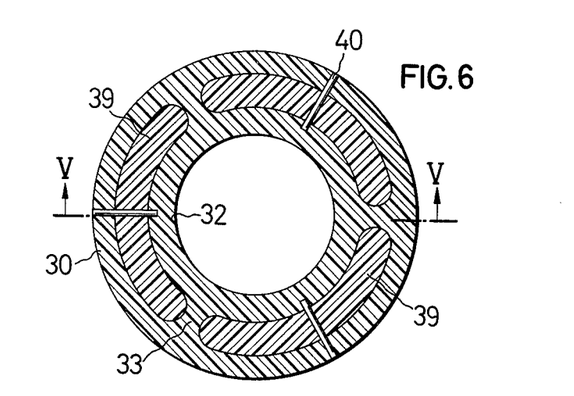

Another variant of the bubble-cap according to the invention is shown in FIGS. 5 and 6. In this bubble-cap, the openings formed by the stays (33), the lower end of the cylindrical jacket (30) and the inner riser (32) are closed by means of matching inserts (39). These inserts can be fixed to the openings by the retention pins (40). Almost the same mechanical strength can be achieved by this embodiment as by the ring (36) in FIG. 3. (35) denotes one of several, oblong window-shaped depressions in the cylindrical jacket.

Like FIG. 3, FIG. 5 is a section through the bubble-cap in the axial plane. A section can be made through the bubble-cap, perpendicular to the axis, in the plane indicated by line VI in FIG. 5. The sectional area formed is shown in FIG. 6. This bubble-cap can be produced by removing material from a plastic cylinder, either from the top or from the bottom. In the latter case, the cover and jacket can also be integrally connected (as in FIG. 5).

An improvement in the mechanical strength is achieved when the stays are extended up to the cover and this is integrally connected with the stays and the cylindrical jacket. Such an embodiment of the bubble-cap according to the invention is shown in FIGS. 7 and 8.

Figure 7:
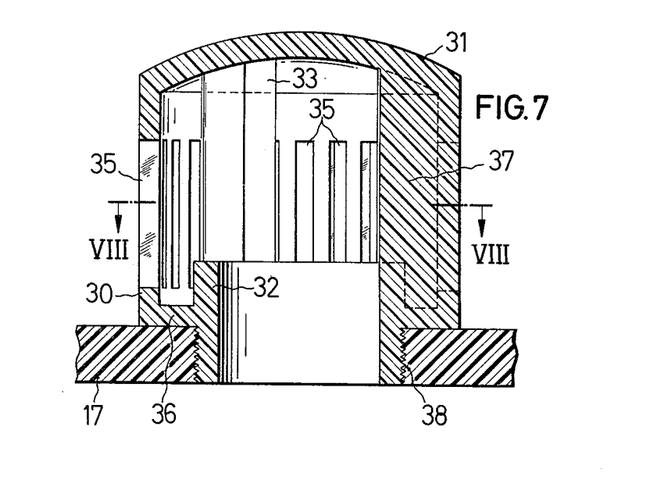
Figure 8:
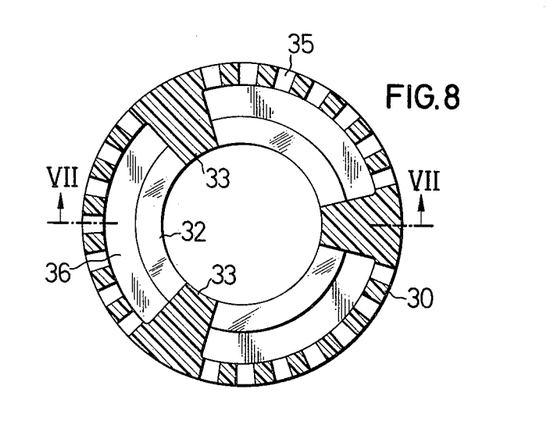

FIG. 7 shows a section through the bubble-cap, in the axial plane. The section shows a stay on the right-hand side. The integral connection of the jacket (30), stay (33), riser (32) and cover (31) is labeled (37). The bubble-cap is fixed in the tray (17) by a screw thread (38). A section can be made through the bubble-cap, perpendicular to the axis, through the plane indicated by line VIII in FIG. 7. The sectional area formed is shown in FIG. 8. The use of bubble-caps with short risers (32) leads to a reduction in pressure drop.

Figure 9:
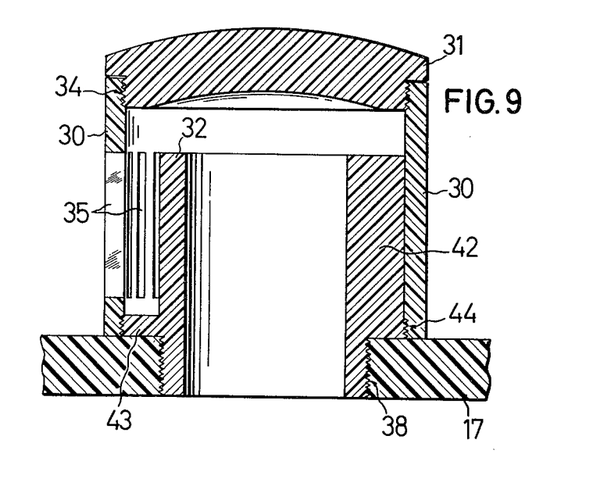
Figure 10:
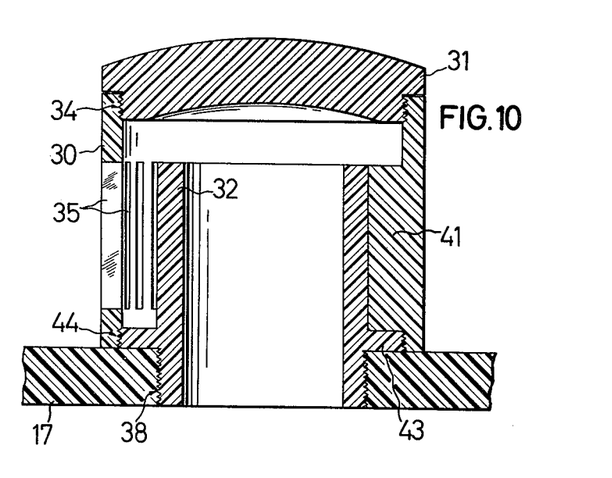

The connection between the riser and the cylindrical jacket does not absolutely have to be an integral connection. A bubble-cap in which the riser and jacket can be separated from one another and which is sufficiently mechanically stable for many purposes is shown in FIGS. 9 and 10. In each case, the figures show a section of the bubble-cap in the axial plane with a stay on the right-hand side (similar to FIG. 3). In these bubble-caps, the annular gap between the lower end of the cylindrical jacket (30) and the concentric inner riser (32) is closed by a disk which forms one piece (43) with the riser. The bubble-cap furthermore contains at least 2 radially arranged stays in the longitudinal direction, which brace the cylindrical jacket (30) against the inner riser (32). In FIG. 9, these stays are integrally connected to the inner riser. This integral connection is labeled (42). In FIG. 10, the stays are integrally connected to the cylindrical jacket. This integral connection is labeled (41). This construction would also enable stays and the riser to be integrally connected to the cover (31) (not shown). It is possible (but not necessary) to integrally connect the cover (31) to the jacket both in FIG. 9 and in FIG. 10. The ring (43) integrally connected to the inner riser can be fixed to the cylindrical jacket (30), for example by retention pins or by a screw thread. In FIGS. 9 and 10, (43) is fixed to the outer jacket (30) by the screw thread (44).

EXAMPLE

Waste sulfuric acid from the nitration of chlorobenzotrifluoride contained 72% of $H_2SO_4$, 2% of $HNO_3$, 1.6% of nitrite, 0.2% of hydrofluoric acid, a total of 0.74% of fluorine, 0.2% of carbon and 55 ppm of chloride. The water content is about 25%.

For regeneration by the method of Pauling, a column with 2 high-silicon cast iron trays and 3 polytetrafluoroethylene trays which were each provided with 7 polytetrafluoroethylene bubble-caps according to FIG. 3 was used. The column sections were screwed tightly together, with the trays, at the flanges. Since it is difficult to seal the apparatus described, and no sulfuric acid vapor should escape, a reduced pressure of 40 mbars is maintained in the kettle. The diameter of the column is about 40 cm.

The temperature was 125° C. at the vapor outlet and 170° C. on the lowest plastic tray. The temperature of the distillation kettle was kept at 315° C. The purified sulfuric acid which runs out has a content of 97.3% of $H_2SO_4$. The residual fluoride content was only 0.007%. This corresponds to a removal of over 99% of the fluoride. Such low fluoride contents do not have an increased corrosive effect (in comparison with fluoride-free sulfuric acid) on the metal of the lower stripping column and of the distillation kettle.

I claim:

1. A process for purifying 65 to 95 percent strength waste sulfuric acid comprising the steps of:

introducing waste sulfuric acid containing water, organic impurities and 0.02 to 5 percent by weight fluoride into an acid-resistant plastic tray of an upper section of a stripping column having 1 to 9 trays, the construction components of the tray in the upper section consisting of an acid-resistant plastic, wherein the acid-resistant plastic is selected from the group consisting of polyvinylidenefluoride, polytrifluorochloroethylene, polyphenylenesulfide and polytetrafluoroethylene, on at least the surface of said components contacting acid vapors or liquid acid;

permitting the waste sulfuric acid to flow to 1 to 3 high silicon cast iron trays in a lower section of the stripping column;

heating and concentrating the waste acid in said stripping column;

passsing the heated and concentrated waste acid into boiling concentrated sulfuric acid in a cast iron Pauling kettle at a kettle temperature of 310° to 325° C.; and condensing sulfuric acid vapors escaping from the kettle by directing the flow of the waste sulfuric acid into the kettle in a countercurrent direction to the sulfuric acid vapors, whereby a purified sulfuric acid is produced;

wherein the ratio of the water content of the waste acid introduced minus the water content of the purified sulfuric acid to the content of the fluoride in the waste acid introduced is not below 10:1.

2. The process of claim 1, wherein the waste sulfuric acid contains organic impurities in an amount not exceeding 2 percent by weight.

3. The process of claim 1, wherein the construction components of the trays in the upper section of a stripping column consist of the acid-resistant plastic.

4. The process of claim 1, wherein the ratio is above 40:1.

5. The process of claim 1, wherein the process is carried out to produce a 95 to 97 percent strength purified sulfuric acid.

* * * * *